(12) United States Patent
Douma et al.

(10) Patent No.: US 7,631,571 B2
(45) Date of Patent: Dec. 15, 2009

(54) YOKE ASSEMBLY FOR A POWER STEERING APPARATUS

(75) Inventors: John David Douma, Beverly Hills, MI (US); Madhu Nambiar, Canton, MI (US); Luis Carballo, Jr., Chih (MX); Brian Robert Burchart, Saline, MI (US); Michael Patrick Rodgers, Mooresville, IN (US)

(73) Assignee: Ford Global Technologies, LLC, Dearborn, MI (US)

( * ) Notice: Subject to any disclaimer, the term of this patent is extended or adjusted under 35 U.S.C. 154(b) by 342 days.

(21) Appl. No.: 11/482,143

(22) Filed: Jul. 6, 2006

(65) Prior Publication Data

US 2008/0006110 A1   Jan. 10, 2008

(51) Int. Cl.
*F16H 1/04* (2006.01)
(52) U.S. Cl. .......................... 74/422; 74/89.17
(58) Field of Classification Search .................. 74/422, 74/388 PS, 89.17; 277/430, 628, 237
See application file for complete search history.

(56) References Cited

U.S. PATENT DOCUMENTS

| 7,210,368 | B2 * | 5/2007 | Odenthal et al. ............... 74/422 |
| 7,225,522 | B1 * | 6/2007 | Little ........................... 29/505 |
| 2003/0230859 | A1 * | 12/2003 | Hisano et al. ................ 277/610 |
| 2008/0006111 | A1 * | 1/2008 | Douma et al. ................. 74/422 |

\* cited by examiner

*Primary Examiner*—Richard WL Ridley
*Assistant Examiner*—Terence Boes
(74) *Attorney, Agent, or Firm*—Joseph E. Root

(57) ABSTRACT

A rack and pinion steering system including a rack slidably supported within a housing that engages in a pinion gear. A yoke assembly, including a yoke member engaging the rack, operates to guide the rack and maintain engagement of the rack and pinion during operation of the steering system. A retainer member holds a yoke plug, used in the yoke assembly, in position and also seals the yoke assembly to provide a sealed interface that protects the internal components of the steering system from water and other contaminants.

20 Claims, 3 Drawing Sheets

YOKE ASSEMBLY FOR A POWER STEERING APPARATUS

CROSS-REFERENCE TO RELATED APPLICATIONS

Not Applicable

BACKGROUND OF THE INVENTION

1. Field of the Invention

The present invention relates generally to a rack and pinion power steering assembly; and more specifically, to a yoke assembly for supporting the rack and pinion of the power steering assembly.

2. Description of Related Art

Modern automotive vehicle steering assemblies typically use a rack and pinion gear system that translates the rotational movement of the steering wheel into linear movement needed to turn the vehicle wheels. In general, a housing encloses a rack and pinion gear set. A steering shaft attaches to the pinion gear such that rotation of the steering wheel turns the pinion gear that correspondingly moves the rack. Tie rods connect the rack to the vehicle wheels such that movement of the rack turns the wheels. Most automotive vehicles utilize a power assisted rack and pinion steering system. Part of the power-assisted steering system assembly includes a cylinder with a piston in the middle wherein the piston connects to the rack. There are two fluid ports one on either side of the piston. Supplying higher-pressure fluid to one side of the piston forces the piston to move which in turn moves the rack. A rotary valve, typically attached to the steering shaft, supplies and meters pressurized fluid to the fluid ports to assist the vehicle operator when exerting force on the steering wheel.

In order to maintain engagement between the teeth of the pinion gear and those of the rack, such steering systems typically employ or utilize a yoke assembly to support the rack and pinion gear set. The yoke assembly includes a yoke, yoke spring, a threaded yoke plug and a lock nut. The yoke transmits a load from the yoke spring to the rack to maintain engagement between the rack and pinion. The opposite end of the yoke spring contacts the yoke plug that threadably engages the housing. The yoke plug is set mechanically to ensure contact between the rack and pinion teeth. Once set, the lock nut locks the yoke plug in place.

Rack grease, which fills the rack and pinion housing cavity, seals the yoke/yoke plug assembly from the outside environment. The steering gear environment is very harsh and is subject to water, debris and other contamination. Over time, the water or other contaminants make their way to the rack and pinion housing through the yoke plug threads and rack grease causing corrosion of the steering assembly components. The corrosion typically results in excessive axial lash in the tie rods causing steering play along with noise, vibration and harshness issues. Corrosion may also cause damage to the steering assembly system seals resulting in power steering fluid loss and eventual loss of the power steering function. Accordingly, there exists a need to provide a rack and pinion steering system having a sealed yoke assembly that provides a robustly sealed interface to protect steering gear internal components from water and other contaminants.

SUMMARY OF THE INVENTION

Accordingly, the present invention is a rack and pinion steering system including a housing. The steering system further includes a rack slidably supported within the housing that engages a pinion gear also supported in the housing. A yoke assembly, including a yoke member engaging the rack, operates to guide the rack and maintain engagement of the teeth of the rack and pinion during operation of the steering system. A biasing member located between the yoke member and a yoke plug presses the yoke member against the rack. A retainer member holds the yoke plug in position and seals the yoke assembly to provide a sealed interface that protects the internal components of the steering system from water and other contaminants.

According to one embodiment of the invention, the retainer member is attached to the yoke plug such that it forms a seal between the retainer member and yoke plug. In addition, a seal member either formed as part of the retainer member or placed between the retainer member and the housing functions to seal the retainer member and housing interface. Accordingly, potential leak paths are sealed.

In a further embodiment of the present invention a separate seal member such as an o-ring is placed between the retainer member and the housing to form a seal between the two components. In addition, a seal member may also be placed between the retainer member and yoke plug.

In an additional embodiment the retainer member is ultrasonically welded to the yoke plug to prevent rotation of the yoke plug and seal the interface between the yoke plug and retainer member.

DETAILED DESCRIPTION OF THE PREFERRED EMBODIMENTS

Figure 1:
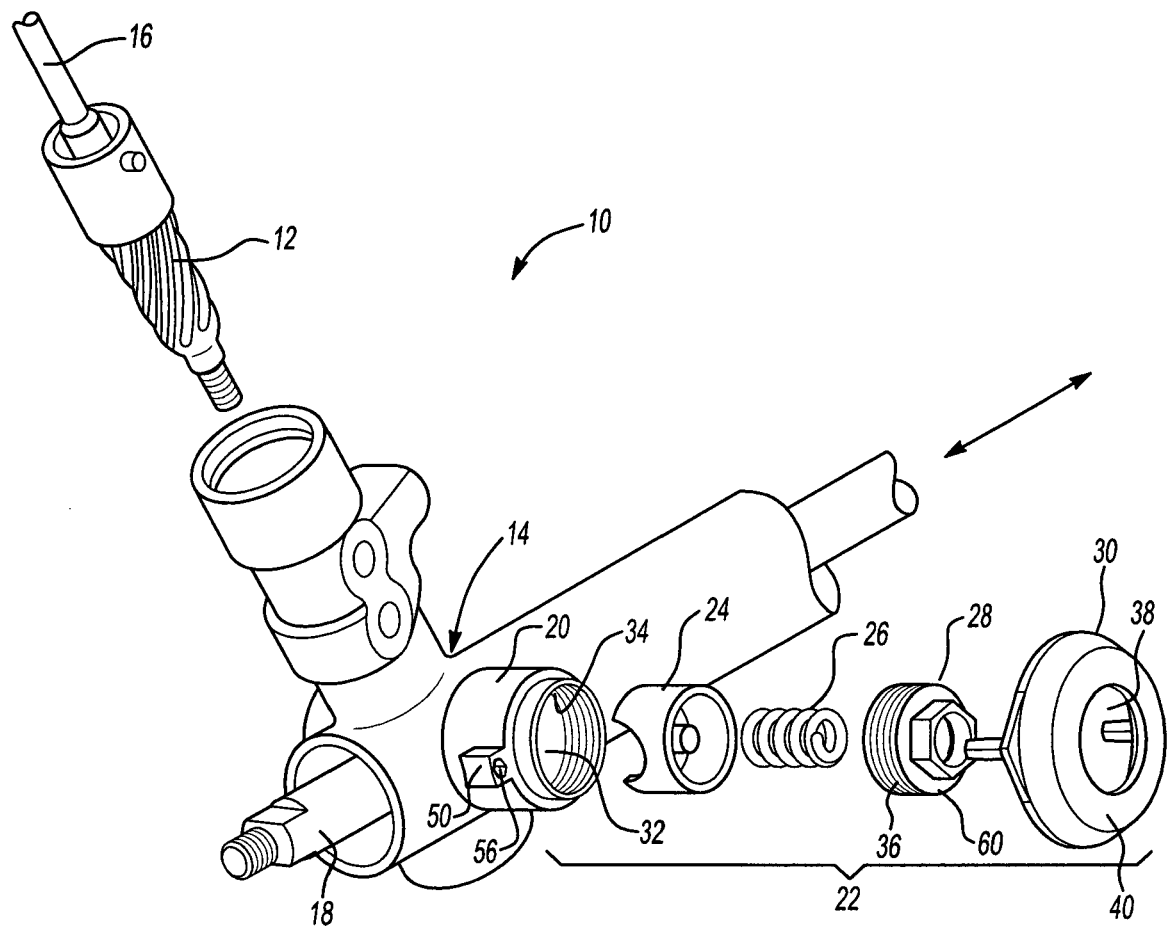
FIG. 1 is an exploded perspective view of the rack and pinion steering system including a yoke apparatus according to one embodiment of the present invention.
Figure 2:
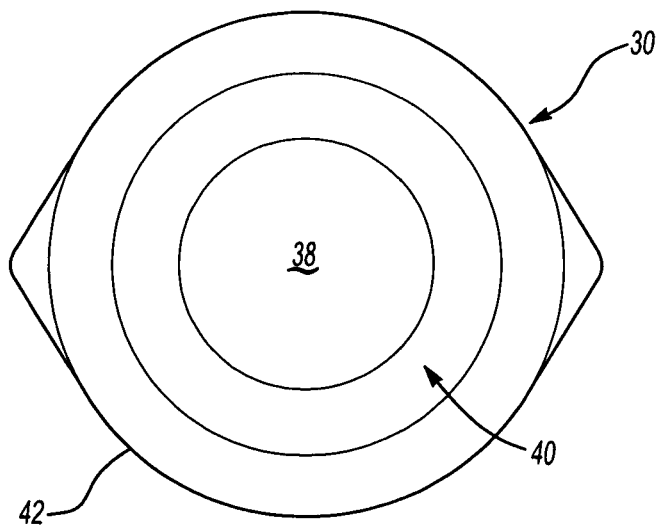
FIG. 2 is a front view of a retainer member of the yoke apparatus according to one embodiment of the present invention.
Figure 3:
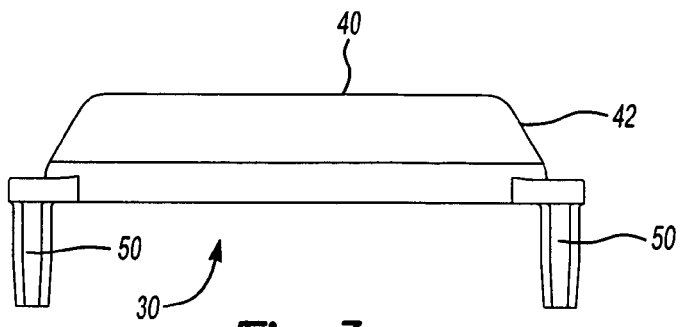
FIG. 3 is a side view of the retainer member of FIG. 2.
Figure 4:
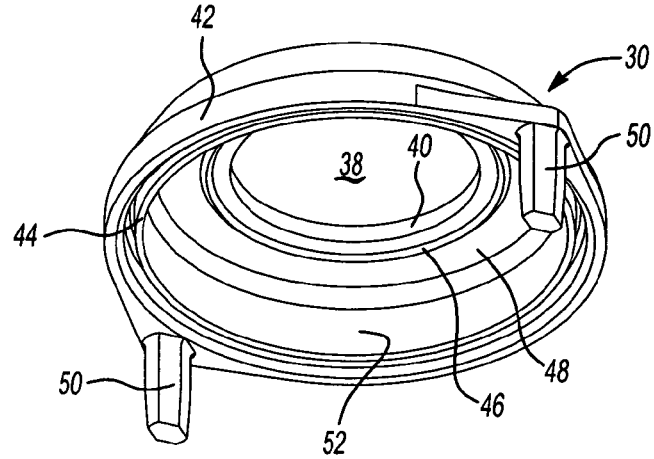
FIG. 4 is a perspective view of the retainer member of FIG. 2.

FIG. 1 shows a perspective view of a rack and pinion steering system, seen generally at 10, according to one embodiment of the present invention. The rack and pinion steering system 10 includes a pinion gear 12 rotatably supported in a housing 14. A pinion shaft 16 attaches the pinion gear 12 to a steering wheel (not shown). A rack 18 supported in the housing 14 connects to the steering wheels (not shown). The rack 18 meshes with the pinion gear 12 such that rotational movement of the steering wheel turns the vehicle wheels in a manner well known in the art.

The housing 14 further includes a cylindrical sleeve 20 formed on the one side of the housing 14 in a direction perpendicular to the rack 18. A yoke assembly 22, located in the cylindrical sleeve 20, supports and maintains engagement of the rack 18 with the pinion gear 12. The yoke assembly includes a yoke member 24, a biasing member or compression spring 26, a yoke plug 28 and a retainer member 30. A central passageway 32 of the cylindrical sleeve 20 slidably receives the yoke member 24. The cylindrical sleeve 20 further includes a threaded portion 34 that receives complementary threads 36 on the yoke plug 28. The biasing member or compression spring 26 is located in the passageway 32 between the yoke member 24 and the yoke plug 28 whereby the force of the biasing member or compression spring 26 pushes the yoke member 24 against the rack 18 to maintain engagement between the rack 18 and the pinion gear 12.

Accordingly, once the yoke assembly 22, specifically the yoke member 24, biasing member 26 and yoke plug 28, are positioned in the cylindrical sleeve 20, the yoke plug 28 is rotated to compress the biasing member 26 and provide a predetermined or preloaded force on the rack 18 through the yoke member 24. Upon reaching the predetermined or preloaded force the retainer member 30, as set forth more fully below, fixes the position of the yoke plug 28.

FIGS. 2-5 illustrate a first embodiment wherein the retainer member 30 has a generally cylindrical cup shape and fits over the cylindrical sleeve 20 housing the yoke assembly 22. The retainer member 30 includes a center aperture 38 formed in the planar base portion 40. An annular sidewall 42 extends from the base portion 40. An annular seal member 44 connected to the base portion 40 and spaced radially from the annular sidewall 42 also extends from the base portion 40. The seal member 44 includes a seal surface 52 configured to engage a complementary radial sealing surface 54 located on the cylindrical sleeve 20. An annular bead 46 is located on the interior or engagement surface 48 of the base portion 40.

Figure 5:
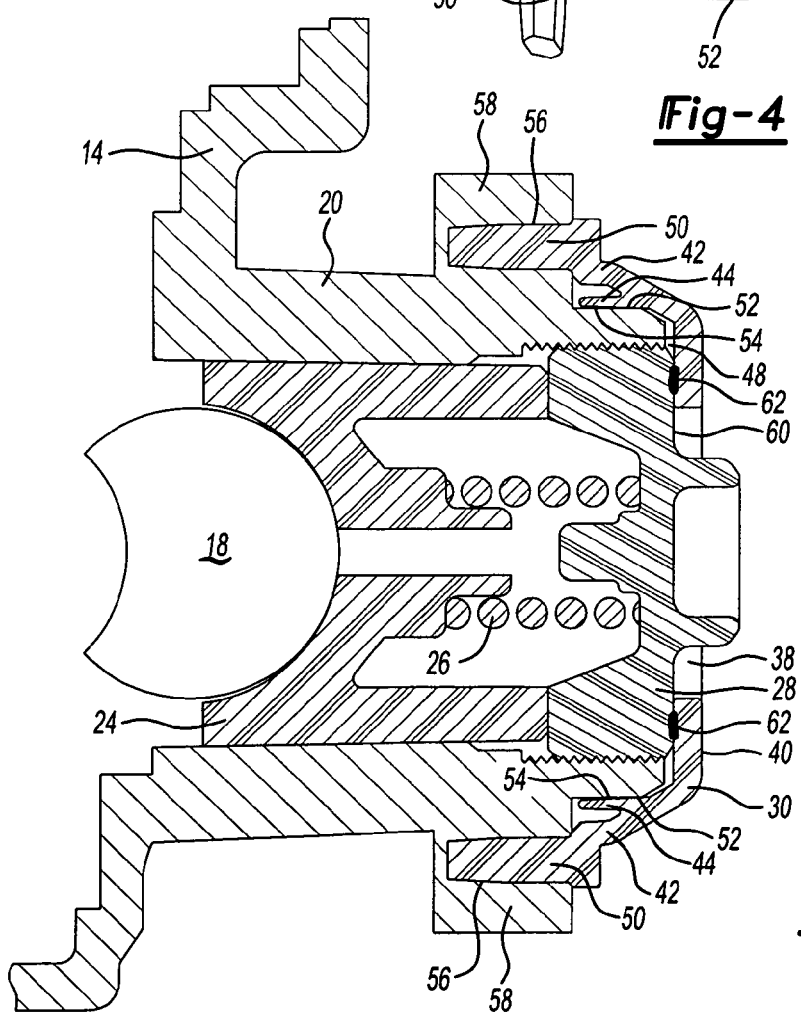
FIG. 5 is a section view of the yoke apparatus according to one embodiment of the present invention.

A pair of anti-rotation tabs 50 are located on the circumference of the annular sidewall 42. As illustrated in FIG. 5, the anti-rotation tabs 50 slide into apertures 56 located in ear portions 58 formed on or adjacent to the cylindrical sleeve 20.

Accordingly, the yoke assembly 22 including the yoke plug 28 is set within the cylindrical sleeve 20 in the conventional way. While in the preferred embodiment, both the yoke plug 28 and the retainer member 30 are formed of a plastic material, other material can also be used. Upon setting the yoke plug 28, the retaining member 30 is installed such that the anti-rotation tabs 50 are slidably received in the apertures 56. As illustrated, the seal surface 52 of the annular seal member 44 engages the radial seal surface 54 of the cylindrical sleeve 20 thereby forming a seal between the retaining member 30 and the cylindrical sleeve 20.

As illustrated in FIG. 5, the interior or engagement surface 48 of the retainer member 30 then contacts the upper or top face 60 of the yoke plug 28. An ultrasonic welding process welds and thereby secures the retaining member 30 to the yoke plug 28. Accordingly, the ultrasonic welding fuses the retainer member 30 to the yoke plug 28 and forms a permanent connection, illustrated as the annular weld 62. The weld 62 is circular, is spaced from and extends about the circumference of the center aperture 38. In this manner the weld 62 forms an annular seal between the retaining member 30 and the yoke plug 28.

In the preferred embodiment, the annular bead 46 formed on the interior or engagement surface 48 and adjacent the center aperture 38 engages the top or outer surface 60 of the yoke plug 28 to ensure a good weld at the interface or junction between the retaining member 30 and yoke plug 28. Welding the retaining member 30 to the yoke plug 28 enables the anti-rotation tabs 50, located in the apertures 56, to prevent movement of the yoke plug 28 and correspondingly maintain the yoke plug 28 at the set position.

As disclosed, welding the retaining member 30 to the yoke plug 28 forms a seal at the interface or junction between the two parts to protect against internal steering gear components from water and other contaminants entering at the retaining member 30 and yoke plug 28 interface. In addition, the retaining member is also sealed to the cylindrical sleeve 20 of the housing 14 through use of the annular seal member 44. As disclosed, the sealing surface 52 of the annular seal member 44 engages the radial seal surface 54 of the sleeve 20 to seal the retainer member 30 to the cylindrical sleeve 20 and thus to the housing 14. Accordingly, potential leak paths are completely sealed to provide a robust joint.

While ultrasonic welding is contemplated as the preferred method to fasten and correspondingly seal the retaining member 30 and the plug 28, other fastening or connection methods that bond the two parts together and form a seal between them such as adhesives or other welding means besides sonic welding is contemplated and may be used. In addition, while the weld forms a seal between the yoke plug and retaining member 30, a seal member such as an O-ring or other type of sealing element may be placed between the retaining member 30 and yoke plug 28 and with the retaining member 30 then spot welded to the yoke plug 28. In this manner, a sealing member positioned between the respective parts forms the seal rather than the weld as set forth above.

Figure 6:
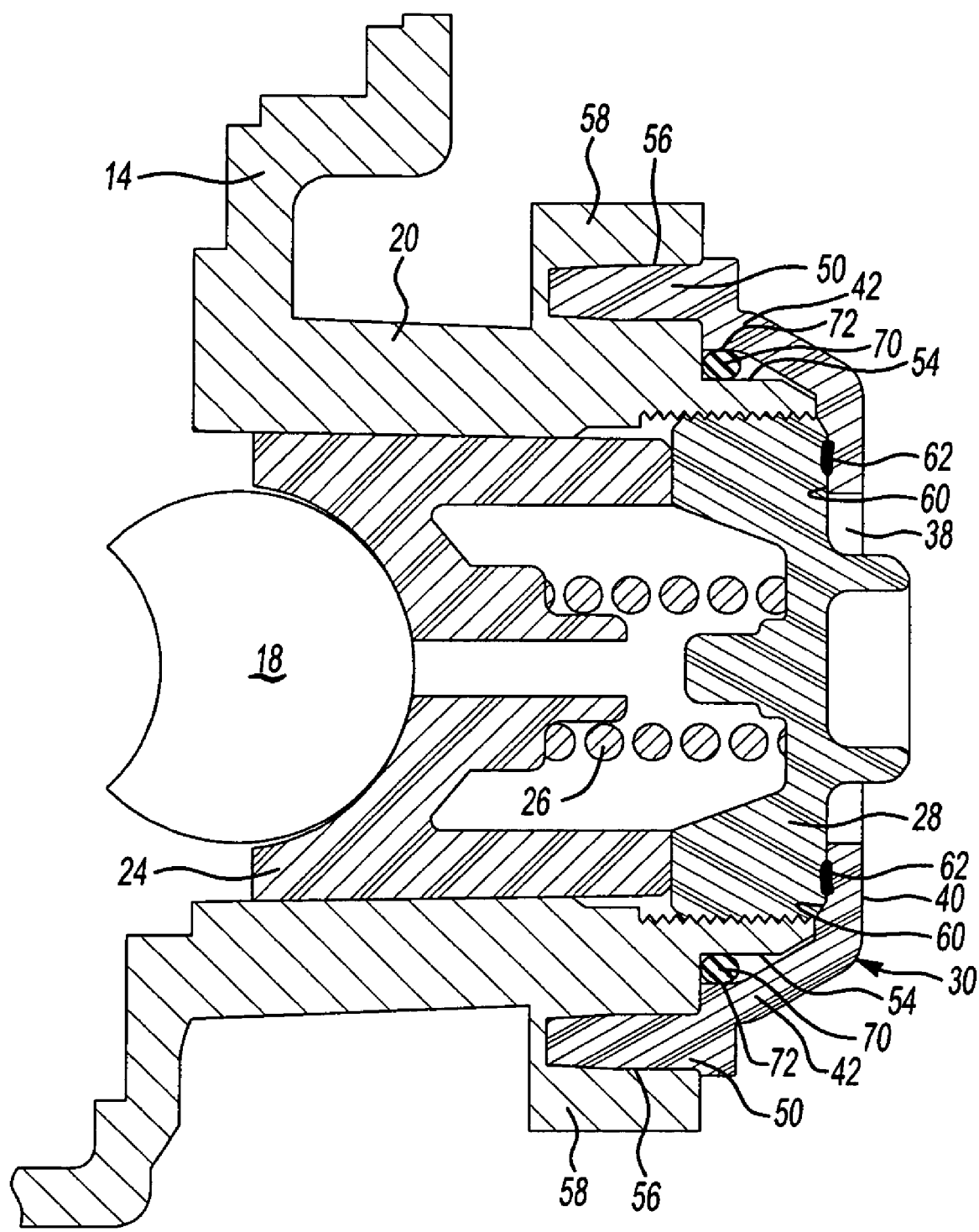
FIG. 6 is a section view of the yoke apparatus according to an alternative embodiment of the present invention.

FIG. 6 illustrates an alternative embodiment of the present invention, utilizing an O-ring 70 located between the radial seal surface 54 of the cylindrical sleeve 20 and a seal surface 72 located on the sidewall 42 of the retaining member 30. Accordingly, the O-ring 70 seals the interface between the retaining member 30 and the cylindrical sleeve 20. As set forth previously, the yoke plug 28 is set in a conventional way. The radial seal surface 54 receives the O-ring 70. To install the retaining member 30 the anti-rotation tabs 50 are located in the apertures 56 located on the ear portions 58. Pushing the retaining member 30 over the end of the cylindrical sleeve 20 compresses the O-ring between the cylindrical sleeve 20 and the retainer member 30 to provide a positive seal against contamination entering the housing 14 at the retaining member 30 and cylindrical sleeve 20 interface. The retaining member 30 continues its travel until it contacts the yoke plug 28 on the upper or top flat face 60 thereof. As set forth in the previous embodiment, the retaining member 30 is ultrasonically welded, as illustrated by the weld 62, to the yoke plug 28. The welding fuses the retainer member 38 to the yoke plug 28 and forms a permanent set and a seal between the yoke plug 28 and retaining member 30.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A rack and pinion steering system comprising:
   a housing;
   a rack slidably supported within said housing;
   a pinion gear supported on said housing and engaging said rack;
   a cylindrical sleeve perpendicular to said rack, the cylindrical sleeve including a threaded portion and a radial sealing surface;
   a yoke member located in said cylindrical sleeve and engaging said rack;
   a yoke plug located in said cylindrical sleeve and engaging said threaded portion of said cylindrical sleeve;
   a biasing member positioned between said yoke member and said yoke plug;
   a retaining member engaging said yoke plug and said cylindrical sleeve, the retaining member including a base portion, an annular sidewall, and an annular seal member spaced radially from said annular sidewall and extending from said base portion configured to engage said radial sealing surface of said cylindrical sleeve; and a seal formed between said retaining member and said yoke plug.

2. A rack and pinion steering system as set forth in claim 1 wherein said annular seal member is disposed between said retaining member and said cylindrical sleeve.

3. A rack and pinion steering system as set forth in claim 2 wherein said annular seal member includes an annular having a seal surface.

4. A rack and pinion steering system as set forth in claim 2 wherein said seal member includes an O-ring, said O-ring disposed between said retaining member and said housing.

5. A rack and pinion steering system as set forth in claim 1 wherein said retaining member is bonded to said yoke plug, said bonding forming said seal between said retaining member and said yoke plug.

6. A rack and pinion steering system as set forth in claim 1 wherein said retaining member is ultrasonically welded to said yoke plug, said ultrasonic welding forming said seal between said retaining member and said yoke plug.

7. A rack and pinion steering system as set forth in claim 1 including an anti-rotation member attached to said retaining member and engaging said cylindrical sleeve.

8. A rack and pinion steering system as set forth in claim 1 wherein said seal between said retaining member and said yoke plug includes a seal member disposed between said retaining member and said yoke plug.

9. A rack and pinion steering system as set forth in claim 8 including said retaining member bonded to said yoke plug.

10. A rack and pinion steering system comprising:
a housing;
a rack slidably supported within said housing;
a pinion gear supported on said housing and engaging said rack;
a cylindrical sleeve perpendicular to said rack, the cylindrical sleeve including a threaded portion and a radial sealing surface;
a yoke member located in said cylindrical sleeve and engaging said rack;
a yoke plug located in said cylindrical sleeve;
a biasing member positioned between said yoke member and said yoke plug; and
cup-shaped retaining member including an anti-rotation member and an annular seal member, said anti-rotation member engaging said cylindrical sleeve, said seal member engaging with said radial sealing surface, said retaining member secured to said yoke plug and forming a seal between said retaining member and said yoke plug.

11. A rack and pinion steering system as set forth in claim 10 including said retaining member secured to said yoke plug by ultrasonic welding wherein said weld forms said seal between said retaining member and said yoke plug.

12. A rack and pinion steering system as set forth in claim 11 wherein said weld extends annularly forming a continuous and unbroken seal between said retaining member and said yoke plug.

13. A rack and pinion steering system as set forth in claim 10 including said retaining member ultrasonically welded to said yoke plug whereby said ultrasonic welding maintains a positional relationship between said retaining member and said yoke plug.

14. A rack and pinion steering system as set forth in claim 10 wherein said seal member disposed between said retaining member and said housing includes an O-ring.

15. A rack and pinion steering system as set forth in claim 10 said seal member having an annular seal forming part of said retaining member, said annular seal having a seal surface whereby said seal surface engages with said annular seal surface of the cylindrical sleeve.

16. A rack and pinion steering system as set forth in claim 10 including a seal member disposed between said retaining member and said yoke plug for sealing an interface between said retaining member and said yoke plug.

17. A rack and pinion steering system as set forth in claim 10 including said retaining member having an aperture therein and a continuous weld connecting said retaining member to said yoke plug, said weld surrounding said aperture and forming said seal between said retaining member and said yoke plug.

18. A rack and pinion steering system as set forth in claim 17 wherein said weld is an ultrasonic weld.

19. A rack and pinion steering system comprising:
a housing;
a rack slidably supported within said housing;
a pinion gear supported on said housing and engaging said rack;
a cylindrical sleeve perpendicular to said rack, the cylindrical sleeve including a threaded portion and a radial sealing surface;
a yoke member located in said cylindrical sleeve and engaging said rack;
a yoke plug located in said cylindrical sleeve;
a biasing member positioned between said yoke member and said yoke plug; and
a cup shaped retaining member having a sidewall and a base portion, said base portion having an aperture therein, an anti-rotation member attached thereto, and an annular seal member attached therein, said retaining member disposed over said cylindrical sleeve and engaging said yoke plug such that said base portion of said retaining member engages said yoke plug, said base portion of said retaining member welded to said yoke plug whereby said weld forms a seal between said retaining member and said yoke plug and said annular seal member engaging with said annular sealing surface of the cylindrical sleeve.

20. A rack and pinion steering system as set forth in claim 19 wherein said seal member disposed between said sidewall and said housing includes an annular seal member attached to said base of said retaining member, said annular seal member having a seal surface that engages a complementary radial seal surface located on said housing.

* * * * *